Jan. 13, 1970 C. J. PEADY 3,489,859

AUDIBLE ALARMS FOR-TELEPHONE SWITCHBOARDS

Filed June 20, 1967

Inventor:
Clifford Jack Peady
By Michael S. Striker,
Attorney

United States Patent Office
3,489,859
Patented Jan. 13, 1970

3,489,859

AUDIBLE ALARMS FOR TELEPHONE SWITCHBOARDS

Clifford Jack Peady, Hurstville, New South Wales, Australia, assignor to Telephone Manufacturing Co. (Australasia), Proprietary Limited, Erskineville, New South Wales, Australia, a company of New South Wales, Australia Filed June 20, 1967, Ser. No. 647,529
Claims priority, application Australia, Aug. 23, 1966 10,077/66
Int. Cl. H04m 3/60
U.S. Cl. 179—27 2 Claims

ABSTRACT OF THE DISCLOSURE

In a manual switchboard, a two-level buzzer circuit for providing one sound level under permanent calling condition and another sound level under "operator recall" condition.

The present invention relates to audible alarms for telephone switchboards. It is conventional practice for telephone switchboards to include an electrical buzzer as an audible indication that a calling condition exists. Usually the buzzer is arranged to operate until such time as the calling condition has either been answered or cancelled. Thus, the buzzer may operate continuously over a period of time.

Some calling conditions, however, notably the "operator re-call" condition, are transitory in nature and it is possible for the operator to miss the call if the buzzer is at the time signalling a normal calling condition. In other words, the audible alarm signal associated with the transistory calling condition may be masked by that of a permanent calling condition.

Figure 1:
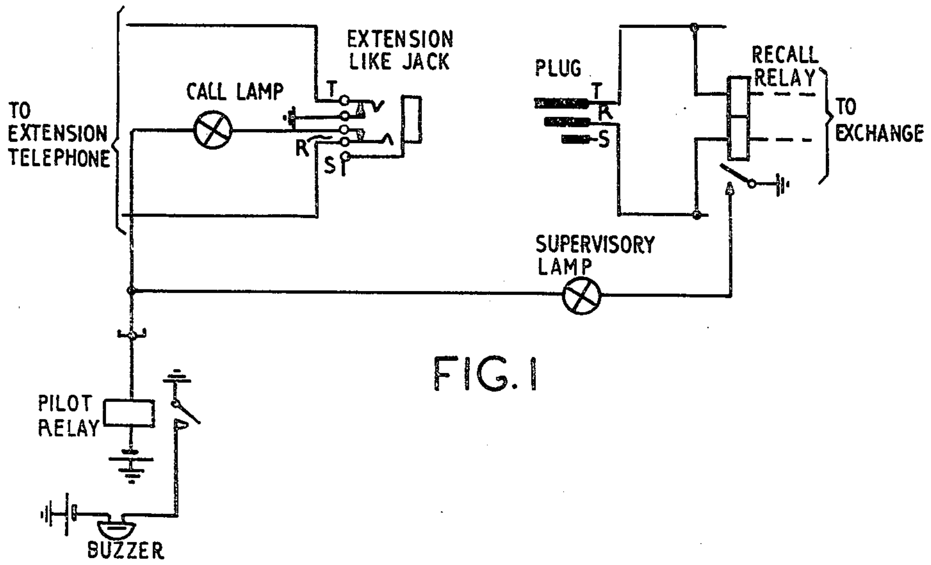

FIG. 1 of the accompanying drawing shows a typical conventional circuit arrangement in a telephone switchboard. In this arrangement the lifting of the handset of an extension telephone causes the call lamp to be energised in series with a common pilot relay, the contacts of the relay being arranged to energise the alarm buzzer. A recall relay and its contacts energise the cord circuit supervisory relay and also the pilot relay. If the buzzer happens to be operating because of an existing calling condition at the time when an operator re-call condition is initiated, no change in the buzzer tone is produced and thus the operator may well miss the transitory calling condition.

The invention consists in the provision in a telephone switchboard having an audible alarm device of means effective to produce an audible signal associated with a permanent calling condition at a first sound level and an audible signal associated with the "operator re-call" condition at a second level which is louder than the first sound level.

In order that the nature of the invention may be better understood a preferred form thereof is hereinafter described by way of example with reference to FIG. 2 of the accompanying drawings.

Figure 2:
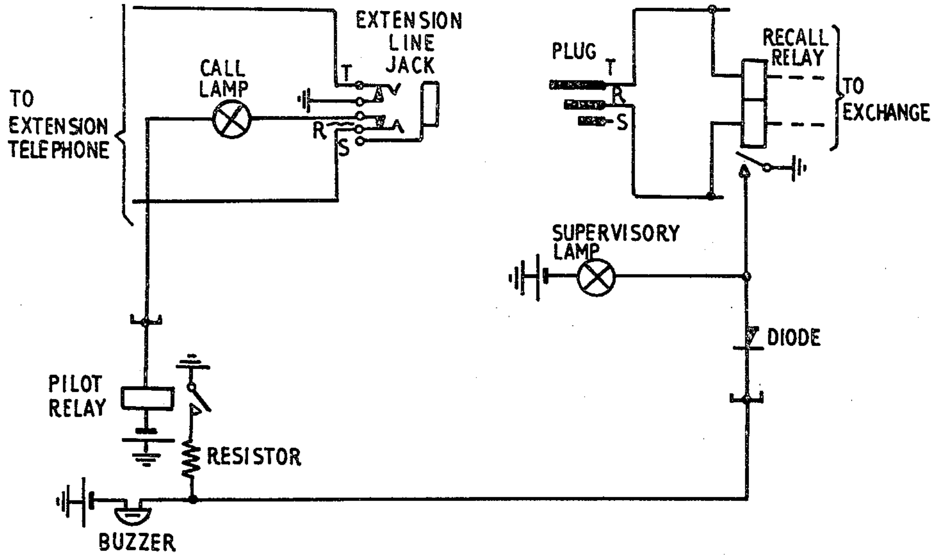

FIG. 2 shows one arrangement incorporating the invention to provide for an audible signal of the "operator re-call" condition which is louder than the audible signal associated with the permanent calling condition.

Lifting of the handset of an extension telephone causes operation of the pilot relay and actuation of the buzzer to produce an audible signal. However, owing to the introduction of a resistor into the buzzer circuit, the buzzer is caused to operate at a relatively low sound level. However, on operation of the re-call relay the full supply voltage is connected to the buzzer, by-passing the resistor referred to above. The buzzer thus operates at a high level so that when a normal calling condition exists, the operation of the re-call relay causes the volume of the signal to increase temporarily thus giving the operator an indication that the operator re-call condition is existing. The diode in the circuit prevents unwanted coupling of supervisory lamp circuits.

The embodiment of the invention described above illustrates only one of a variety of ways in which the invention may be embodied in a telephone switchboard.

I claim:

1. In a telephone switchboard having an audible alarm device, means effective to produce an audible signal associated with a permanent calling condition at a first sound level and an audible signal associated with the "operator re-call" condition at a second sound level which is louder than the first sound level.

2. In a telephone switchboard the combination claimed in claim 1, wherein the audible signal associated with a permanent calling condition is produced by the application of a voltage to the audible alarm device through a resistor whereas the signal associated with the operator re-call condition is produced by applying the same voltage directly to the audible alarm device.

No references cited.

KATHLEEN H. CLAFFY, Primary Examiner

T. W. BROWN, Assistant Examiner